(12) United States Patent
Wu et al.

(10) Patent No.: US 11,029,440 B2
(45) Date of Patent: Jun. 8, 2021

(54) METHODS AND SYSTEMS WITH ESTIMATED SYNCHRONIZATION BETWEEN MODULAR DOWNHOLE LOGGING SYSTEM MODULES

(71) Applicant: Halliburton Energy Services, Inc., Houston, TX (US)

(72) Inventors: Hsu-Hsiang Wu, Sugar Land, TX (US); Matthew Chase Griffing, Kingwood, TX (US); Christopher Golla, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 30 days.

(21) Appl. No.: 16/617,977

(22) PCT Filed: Jun. 27, 2017

(86) PCT No.: PCT/US2017/039469
§ 371 (c)(1),
(2) Date: Nov. 27, 2019

(87) PCT Pub. No.: WO2019/005010
PCT Pub. Date: Jan. 3, 2019

(65) Prior Publication Data
US 2020/0174151 A1 Jun. 4, 2020

(51) Int. Cl.
*E21B 47/12* (2012.01)
*G01V 3/30* (2006.01)
(Continued)

(52) U.S. Cl.
CPC .............. *G01V 3/30* (2013.01); *E21B 47/26* (2020.05); *G01V 3/38* (2013.01); *G01V 2210/43* (2013.01)

(58) Field of Classification Search
CPC .......... E21B 47/13; E21B 47/00; E21B 47/12; E21B 49/00; G01V 3/30; G01V 2210/43; G01V 3/38
See application file for complete search history.

(56) References Cited

U.S. PATENT DOCUMENTS

| 4,419,748 A | 12/1983 | Siegfried, II |
| 8,106,791 B2 * | 1/2012 | Thompson ........... G01V 11/002 340/854.3 |

(Continued)

FOREIGN PATENT DOCUMENTS

| WO | 2014003701 A1 | 1/2014 |
| WO | 2014003702 A1 | 1/2014 |
| WO | 2014098806 A1 | 6/2014 |

OTHER PUBLICATIONS

International Search Report and Written Opinion for PCT application No. PCT/US2017/039469 dated Dec. 26, 2017, 7 pages.
(Continued)

*Primary Examiner* — Alesa Allgood
(74) *Attorney, Agent, or Firm* — Locke Lord LLP

(57) ABSTRACT

A modular downhole logging system includes a transmitter module having a local frequency, wherein the transmitter module transmits interrogation signals into a formation based on the local frequency. The downhole system also includes a receiver module axially-spaced from the transmitter module and that receives response signals corresponding to the interrogation signals, wherein the receiver module includes sampling logic and sync estimation logic. The sync estimation logic is configured to perform sync estimation operations including estimating the local frequency of the transmitter module based on analysis of response signal Fourier transform results corresponding to different frequencies. The sampling logic/clock is configured to sample the response signals based on the estimated
(Continued)

local frequency of the transmitter module, wherein a processor derives formation property values using the sampled response signals.

20 Claims, 11 Drawing Sheets

(51) Int. Cl.
*E21B 47/26* (2012.01)
*G01V 3/38* (2006.01)

(56) References Cited

U.S. PATENT DOCUMENTS

| | | | |
|---|---|---|---|
| 9,201,156 B2* | 12/2015 | Smithson | G01V 3/30 |
| 2006/0192625 A1 | 8/2006 | Sorrells et al. | |
| 2008/0061789 A1* | 3/2008 | Coates | E21B 47/13 |
| | | | 324/333 |
| 2008/0253230 A1* | 10/2008 | Thompson | G01V 11/002 |
| | | | 367/129 |
| 2011/0095866 A1 | 4/2011 | Karr | |
| 2011/0251813 A1 | 10/2011 | Coman et al. | |
| 2012/0046868 A1 | 2/2012 | Tchakarov et al. | |
| 2012/0163523 A1 | 6/2012 | Tang | |
| 2012/0232800 A1 | 9/2012 | Overby et al. | |
| 2014/0192621 A1 | 7/2014 | Ram et al. | |

OTHER PUBLICATIONS

Michael Moore, Christopher Watson, Matt King, Simon McClusky and Paul Tregoning; "Empirical modelling of site-speci!c errors in continuous GPS data"; Springer-Verlag Berlin Heidelberg; Jun. 3, 2014; 14 pages.

* cited by examiner

METHODS AND SYSTEMS WITH ESTIMATED SYNCHRONIZATION BETWEEN MODULAR DOWNHOLE LOGGING SYSTEM MODULES

BACKGROUND

Modern petroleum drilling and production operations demand a great quantity of information relating to the parameters and conditions downhole. Such information typically includes the location and orientation of the wellbore and drilling assembly, earth formation properties, and drilling environment parameters downhole. The collection of information relating to formation properties and conditions downhole is commonly referred to as "logging."

Various logging tools exist for use in wireline logging and logging-while-drilling operations. One example logging tool is a resistivity logging tool, which includes one or more antennas for transmitting an electromagnetic signal into the formation and one or more antennas for receiving a formation response. When operated at low frequencies, resistivity logging tools may be referred to as "induction" tools. Meanwhile, when operated at high frequencies, resistivity logging tools may be referred to as electromagnetic wave propagation tools.

Some logging tools, including some resistivity logging tools, employ antennas connected to different electronic components (e.g., different clocks). When different electronics are used for different antennas, synchronization ensures communications or measurements are interpreted correctly. The synchronization issue is not trivial and varies for different logging tools and scenarios. A continuous synchronization signal is sometimes not possible (or is undesirable) due to the low telemetry bandwidth available downhole and the large amount of information that needs to be conveyed between or from downhole tools. Efforts to reduce the amount of synchronization needed between separated logging tool electronics are ongoing.

BRIEF DESCRIPTION OF THE DRAWINGS

Accordingly, there are disclosed in the drawings and the following description systems and methods with estimated synchronization between modular downhole logging system modules. In the drawings.

modular downhole logging

Figure 1:
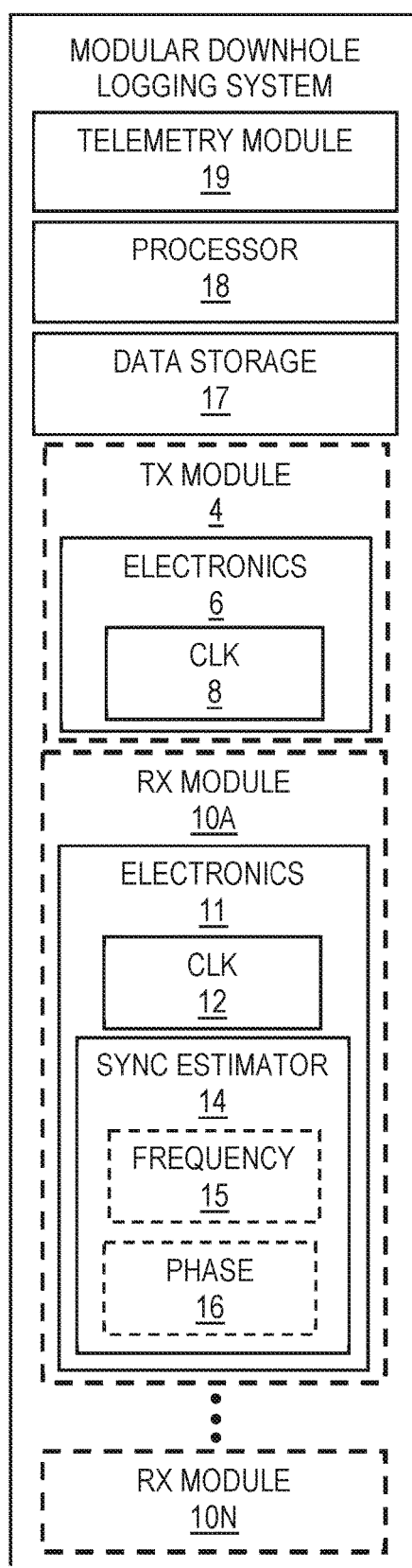
FIG. 1 is a block diagram showing an illustrative modular downhole logging system.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical connection. Thus, if a first device couples to a second device, that connection may be through a direct electrical connection, or through an indirect electrical connection via other devices and connections. In addition, the term "attached" is intended to mean either an indirect or a direct physical connection. Thus, if a first device attaches to a second device, that connection may be through a direct physical connection, or through an indirect physical connection via other devices and connections.

DETAILED DESCRIPTION

Disclosed herein are systems and methods with estimated synchronization between modular downhole logging system modules. The disclosed estimated synchronization techniques may be applied to different types of downhole logging technology, where separated electronics (e.g., different clocks) are employed for different modules. In at least some embodiments, the separated electronics of a modular downhole logging system correspond to at least one transmitter module and at least one receiver module that are within a single housing. The single housing can be used to house modules of a single logging technology (e.g., resistivity logging, sonic logging, etc.) or multiple logging technologies. Alternatively, the separated electronics of a modular downhole logging system may correspond to at least one transmitter module and at least one receiver module that are distributed across a plurality of housings (subs). The plurality of housings may correspond to a single logging technology (e.g., resistivity logging, sonic logging, etc.) or multiple logging technologies. In at least some embodiments, a modular downhole logging system can include a plurality of housings with distributed transmitter modules and/or receiver modules, where the housings are coupled to each other directly or indirectly. Also, the coupling of such housings can be rigid or flexible. For example, in a logging-while-drilling scenario, a rigid coupling between housings of a modular downhole logging system is needed. Meanwhile, in a wireline logging scenario, a rigid or flexible coupling between housings of a modular downhole logging system may be used. The coupling components used between adjacent housings of a modular downhole logging system may be, for example, a wireline, an umbilical, a slickline, coiled tubing, metallic tubulars (drillstring or casing segments), wired tubulars, or other couplers. In one embodiment, transmitter and/or receiver modules of a modular downhole logging system are on opposite sides of a mud motor to facilitate near-bit or at-bit measurements.

In accordance with at least some embodiments, estimated synchronization as described herein is used in a modular downhole logging system scenario involving transmission of interrogation signals into a formation, and receipt of response signals corresponding to the interrogation signals. The interrogation signals are transmitted, for example, by a transmitter module of a modular downhole logging system, where the transmitter module has a local clock/oscillator with a certain frequency and at least one local operating frequency for antenna transmissions (e.g., transmitting the interrogation signals), where the at least one local operating frequency of the transmitter module is a function of the transmitter module's local clock/oscillator. The frequency of the transmitter module's local clock/oscillator is not necessarily the same as the local operating frequency of a transmitter module's antenna and/or a receiver module's antenna. For example, a frequency divider (e.g., a $2^{10}$ divider) can be used to change a local clock/oscillator frequency (e.g., 16.384 MHz) to a local operating frequency (e.g., 16 kHz) for transmitter antenna signals. Each receiver module of a modular downhole logging system includes the same or similar components as those used with the transmitter module (e.g., a local clock/oscillator, divider, etc.) to obtain a compatible local operating frequency for receiver antennas. However, for modular downhole logging systems with separated transmitter and receiver modules as described herein, some drift between the local clocks/oscillators (or between local operating frequencies) often occurs. Accordingly, the disclosed techniques may be used to identify and/or account for the drift or error between transmitter and receiver local operating frequencies of a modular downhole logging system and/or the related local clock/oscillator frequencies.

In accordance with at least some embodiments, sync estimation operations for a modular downhole logging system are performed by a receiver module (or each receiver module as needed) to identify and/or account for the drift or error between transmitter and receiver local operating frequencies of the modular downhole logging system and/or between transmitter and receiver local clock/oscillator frequencies. As an example, receiver modules can receive response signals, corresponding to interrogation signals transmitted by one or more transmitter modules, and can perform sync estimation operations to estimate a transmitter module's local frequency (e.g., the local operating frequency of a transmitter module antenna and/or the frequency of the transmitter's module local clock/oscillator). In at least some embodiments, the sync estimation operations include estimating a transmitter module's local frequency based on analysis of response signal Fourier transform results corresponding to different frequencies. At the receiver module, at least some of the response signals are sampled based on the estimated transmitter module frequency. A processor of the modular downhole logging system derives formation property values using the sampled response signals.

In at least some embodiments, an example modular downhole logging system includes a transmitter module having a local frequency (e.g., a local clock/oscillator frequency or a local operating frequency for transmitter antennas), where the transmitter module transmits interrogation signals into a formation based on the local frequency. The modular downhole logging system also includes a receiver module that receives response signals corresponding to the interrogation signals, wherein the receiver module includes sampling logic and sync estimation logic. The sync estimation logic is configured to perform sync estimation operations including estimating the local frequency of the transmitter module based on analysis of response signal Fourier transform results corresponding to different frequencies. The sampling logic is configured to sample the response signals based on the estimated local frequency of the transmitter module. The modular downhole logging system also includes a processor that derives formation property values using the sampled response signals.

Meanwhile, an example method includes deploying a modular downhole logging system in a borehole, the modular downhole logging system having at least one transmitter module, at least one receiver module, and a processor. The method also includes transmitting, by the at least one transmitter module, interrogation signals into a formation surrounding the borehole based on a local frequency of the transmitter module. The method also includes receiving, by the at least one receiver module, response signals corresponding to the interrogation signals. The method also includes performing sync estimation operations, by the at least one receiver module, wherein the sync estimation operations include estimating the local frequency of the transmitter module based on analysis of response signal Fourier transform results corresponding to different frequencies. The method also includes sampling, by the at least one receiver module, at least some of the response signals based on the estimated local frequency of the transmitter module. The method also includes deriving, by the processor, formation property values using the sampled response signals.

The disclosed methods and systems are best understood when described in an illustrative usage context. FIG. 1 is a block diagram showing an illustrative modular downhole logging system 2. The modular downhole logging system 2 performs, for example, resistivity logging, sonic logging, and/or other types of logging. As shown, the modular downhole logging system 2 includes a transmitter (TX) module 4 with electronics 6 that operate using a clock 8. The modular downhole logging system 2 also includes a receiver (RX) module 10A spaced from the TX module 4 (e.g., at least axially-spaced by several centimeters up to several meters), where the RX module 10A includes electronics 11 that operate using another clock 12. The RX module 10A also includes a sync estimator module 14 that performs sync frequency operations 15 and sync phase operations 16 without use of sync control signals from the TX module 4. The sync estimator module 14 may comprise a processor, a memory, and/or other components configured with instructions or logic to perform the sync estimation operations described herein. In at least some embodiments, the modular downhole logging system 2 includes RX module 10N to represent that the modular downhole logging system 2 can include a plurality of RX modules 10A-10N, where each of the RX modules 10A-10N may include similar components (e.g., electronics 11, a clock 12, and a sync estimator 14). In at least some embodiments, the RX modules 10A-10N are spaced from the TX module 4 and from each other to enable analysis of a received signal that travels through different portions and/or different depths of the downhole formation. As an example, the axial spacing between transmitters and receivers used for resistivity logging may vary from several centimeters up to several meters. As desired, resistivity logging may involve a plurality of different axial spacings between different transmitter-receiver pairs to provide multiple resolution and depth of investigation options.

As shown, the modular downhole logging system 2 of FIG. 1 also includes data storage 17, a processor 18, and a telemetry module 19. In different embodiments, the data storage 17, the processor 18, and the telemetry module 19 may correspond to downhole components only, surface components only, or a combination of downhole and surface components. Example telemetry techniques include mud pulse telemetry, acoustic telemetry, electromagnetic telemetry (wired or wireless), or other known telemetry options. Such telemetry may occur between components of the modular downhole logging system 2 and components at earth's surface and/or between components of the modular downhole logging system 2 and other downhole tools, systems, or system modules. Without limitation to other telemetry uses and options, communication between modules of the modular downhole logging system 2 may be wired, wireless, or a combination of both.

In operation, the modular downhole logging system 2 uses the TX module 4 and the RX modules 10A-10N to obtain measurements indicative of downhole formation parameters. For example, TX module 4 may transmit interrogation signals into a formation. The interrogation signals will travel through the downhole formation and corresponding response signals will be received at each of the RX modules 10A-10N (assuming attenuation and noise do not prevent signal analysis). The response signals are digitized and stored, for example, by data storage 17. The processor 18 is able to access the stored signals and analyze the signal parameters (e.g., frequency, amplitude, phase). For example, the parameters of response signals can be compared with the parameters of the original interrogation signal and/or compared with the parameters of other response signals by the processor 18. In some embodiments, the ratios of response signals and/or the differences between response signals can be used in the analysis.

To ensure accuracy of interpreting response signals received by the RX modules 10A-10N relative to interrogation signals transmitted by the TX module 4, the respective clocks (e.g., clock 8 and clock 12) need to be synchronized or the difference needs to be accounted for. Instead of transmitting a sync control signal to each of the RX modules 10A-10N to enable synchronization between TX and RX clocks, the disclosed embodiments employ sync estimators (e.g., sync estimator module 14) at each RX module 10A-10N. In at least some embodiments, each sync estimator is configured to perform sync estimation operations (e.g., sync frequency operations 15 or sync phase operations 16) that estimate the sync frequency and sync phase or that account for any offsets.

As an example, sync frequency operations 15 may include estimating a local frequency of the TX module (e.g., a local clock/oscillator frequency or a local operating frequency for transmitter antennas) based on analysis of response signal Fourier transform results corresponding to different frequencies. In other words, the Fourier transform results indicate which of the different frequencies is closest to the local frequency of the TX module (i.e., the frequency that maximizes the signal amplitude will be closest to the local frequency of the TX module). Once the local frequency of the TX module has been estimated, each RX module configures its respective local frequency (e.g., a local clock/oscillator frequency or a local operating frequency for receiver antennas) to sample the response signals based on the estimated local frequency of the TX module. In this manner, the accuracy of response signal samples for use with deriving formation properties can be maintained while also avoiding ongoing sync control signals, thus providing an increased telemetry data rate since sync control signals are avoided. On the other hand, additional processing operations will be performed at each RX module to perform the sync estimation operations.

Besides estimating the operating frequency, sync estimation operations performed by each sync estimator may include sync phase operations 16 such as determining response signal ratios to account for phase offset. In such case, the processor 18 derives formation property values using the response signal ratios. As another example, the sync estimation operations may include sync phase operations 16 such as normalizing response signals based on a predetermined transmitter current to account for phase offset. In such case, the processor 18 derives formation property values using the normalized response signals.

In some embodiments, sync estimation operations are selectively performed. For example, sync estimation operations can be performed when response signals are received by two modular downhole logging system receiver modules with synchronized phase with respect to the modular downhole logging system transmitter module. As another example, sync estimation operations can be performed when response signals corresponding to two modular downhole logging system transmitter modules with synchronized phase are received by the modular downhole logging system receiver module. As another example, sync estimation operations can be performed when response signals corresponding to interrogation signals initiated by the modular downhole logging system transmitter module at different times, depths, or azimuthal angles are received by the modular downhole logging system receiver module.

The result of the analysis performed by the processor 18 may be one-dimensional (1D), two-dimensional (2D), and/or three-dimensional (3D) formation parameter values that vary as a function of the position of the modular downhole logging system 2 in a borehole. For example, the processor 18 may output formation parameter values as a function of depth (i.e., 1D data), formation parameter values as a function of depth and azimuthal angle (i.e., 2D data), and/or formation parameter values as a function of depth, azimuthal angle, and radial distance from the borehole (i.e., 3D data). At least some of the formation parameter values can be provided to the telemetry module 19, which conveys these values to earth's surface and/or to other downhole tools via an available telemetry channel compatible with the telemetry module 19. Example telemetry techniques include mud pulse telemetry, acoustic telemetry, electromagnetic telemetry (wired or wireless), or other known telemetry options. At earth's surface, the formation parameter values (or related logs or images) may be displayed using a display device (e.g., a computer or printer). The displayed values or images are analyzed with or without involvement of a user. Additionally or alternatively, the formation parameter values may be conveyed from the telemetry module 19 to another downhole system or tool configured to analyze the formation parameter values and/or to perform one or more downhole operations in response to the formation parameter values or commands derived therefrom. Regardless of whether the downhole formation parameters are analyzed downhole or at earth's surface, various operations such as directional drilling operations, perforating operations and/or other well completion operations, fluid flow control operations, and/or well intervention operations can be performed in response to the downhole formation parameters or commands derived therefrom.

In different embodiments, the TX module 4 and the RX modules 10A-10N of the modular downhole logging system 2 are within a single housing corresponding to one or more logging technologies (e.g., resistivity logging, sonic logging, etc.). Alternatively, the TX module 4 and the RX modules 10A-10N of the modular downhole logging system 2 are distributed across a plurality of housings. The plurality of housings may correspond to a single logging technology (e.g., resistivity logging, sonic logging, etc.) or multiple logging technologies. If multiple logging technologies are distributed across multiple housings, each housing may include components of a single logging technology (e.g., resistivity logging, sonic logging, etc.) or multiple logging technologies. While not required, different logging technologies can share certain generic components (e.g., power supply components, processing components, telemetry components, and/or other components). In different embodiments, the plurality of housings with distributed TX modules and/or RX modules can be coupled to each other directly or indirectly. Also, the coupling of housings can be rigid or flexible. For example, in a logging-while-drilling scenario, a rigid coupling between housings is needed. Meanwhile, in a wireline logging scenario, a rigid or flexible coupling between housings may be used. The coupling components between adjacent housings with transmitter and/or receiver modules may be, for example, a wireline, an umbilical, a slickline, coiled tubing, metallic tubulars (drillstring or casing segments), wired tubulars, or other couplers. In one embodiment, the TX module 4 and/or certain ones of the RX modules 10A-10N are on opposite sides of a mud motor to facilitate near-bit or at-bit measurements.

Figure 2A:
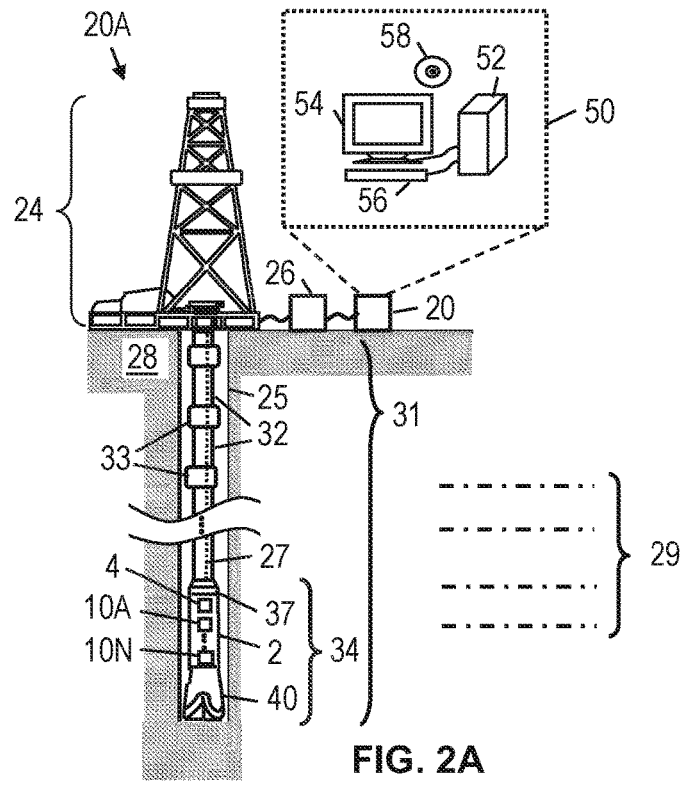
FIG. 2A is a schematic diagram showing an illustrative drilling environment.

FIG. 2A is a schematic diagram showing an illustrative drilling environment 20A that may include a modular downhole logging system 2. In FIG. 2A, a drilling assembly 24 enables a drill string 31 to be lowered and raised in a borehole 25 that penetrates formations 29 of the earth 28. The drill string 31 is formed, for example, from a modular set of drill string segments 32 and couplers 33. At the lower end of the drill string 31, a bottomhole assembly 34 with a drill bit 40 removes material from the formations 29 using known drilling techniques. The bottomhole assembly 34 also includes one or more drill collars 37 and a modular downhole logging system 2. As previously described with respect to FIG. 1, the modular downhole logging system 2 includes a TX module 4 and one or more RX modules 10A-10N axially spaced from one another, where each of the RX modules 10A-10N includes a sync estimator module 14 to perform sync estimation operations as described herein. As previously discussed, the different modules of the modular downhole logging system 2 may be within a single housing or may be distributed across multiple housings as described herein. For the drilling environment 20A, the housing(s) for the modular downhole logging system 2 provide sufficient rigidity to support drilling operations. Also, the modular downhole logging system 2 of FIG. 2A may include one logging technology or multiple logging technologies as described herein.

In accordance with at least some embodiments, measurements obtained by the modular downhole logging system 2 of FIG. 2A are analyzed and downhole formation parameters derived from the measurements are conveyed to earth's surface using known telemetry techniques (e.g., wired pipe telemetry, mud pulse telemetry, acoustic telemetry, electromagnetic telemetry) and/or are stored by the modular downhole logging system 2. In at least some embodiments, a telemetry channel 27 may extend from the BHA 34 to earth's surface. For example, the telemetry channel 27 may take different forms such as a cable with electrical conductors and/or optical waveguides (e.g., fibers), drillstring components, fluids, and/or other telemetry channels to enable transfer of power and/or communications between the bottomhole assembly 34 and earth's surface. In different embodiments, the telemetry channel 27 may be integrated with, attached to, or inside the modular components of the drill string 31 (e.g., wired pipe technology). The telemetry channel 27 supports telemetry options such as wired electromagnetic telemetry, wireless electromagnetic telemetry, acoustic telemetry, mud pulse telemetry, pressure pulse telemetry, etc.).

In FIG. 2A, an interface 26 at earth's surface receives downhole formation parameters and/or related measurements via the telemetry channel 27 and conveys the downhole formation parameters and/or related measurements to a computer system 50. In some embodiments, the surface interface 26 and/or the computer system 50 may perform various operations such as converting signals from one format to another and storing downhole formation parameters and/or related measurements. The computer system 50 also may operate to analyze downhole formation parameters and/or related measurements to provide logs, images, or updated downhole formation models. Directional drilling operations and/or other downhole operations (e.g., fluid flow control, pressure control, valve position adjustment, logging tool updates) can be updated based on analysis of the downhole formation parameters and/or related measurements. In different embodiments, a user can interact with the computer system 50 to select analysis or response options (e.g., logs, images, direction drilling updates, downhole operation updates). Additionally or alternatively, analysis or response options can be automated (e.g., based on predetermined rules).

In at least some embodiments, the computer system 50 includes a processing unit 52 that performs analysis or response operations by executing software or instructions obtained from a local or remote non-transitory computer-readable medium 58. In at least some embodiments, the processing unit 52 of FIG. 2A performs some or all of the operations of processor 18 of FIG. 1. Additionally or alternatively, the processing unit 52 performs other operations. The computer system 50 also may include input device(s) 56 (e.g., a keyboard, mouse, touchpad, etc.) and output device(s) 54 (e.g., a monitor, printer, etc.). Such input device(s) 56 and/or output device(s) 54 provide a user interface that enables an operator to interact with the modular downhole logging system 2 and/or software executed by the processing unit 52. For example, the computer system 50 may enable an operator to select logging options, to select analysis options, to view obtained measurements, to view downhole formation properties (e.g., logs or images) obtained from the measurements, to adjust directional drilling, to adjust downhole operations, and/or to perform other tasks. Further, information about the downhole position at which measurements are obtained may be taken into account and used to facilitate well completion decisions and/or other strategic decisions related to producing hydrocarbons.

At various times during the drilling process, the drill string 31 shown in FIG. 2A may be removed from the borehole 25. With the drill string 31 removed, another option for deploying a modular downhole logging system 2 involves the wireline environment 20B of FIG. 2B. Yet other deployment options include, for example, a slick line, a coiled tubing, a tractor assembly, a tubular string, or combinations thereof. With some deployment options (e.g., certain drilling scenarios and/or certain slick line, coiled tubing, tractor assembly, or tubing string scenarios), power is not provided from earth's surface to the modular downhole logging system 2. In such cases, remote power supplies (e.g., batteries) are provided with the modular downhole logging system 2 to power its operations.

Figure 2B:
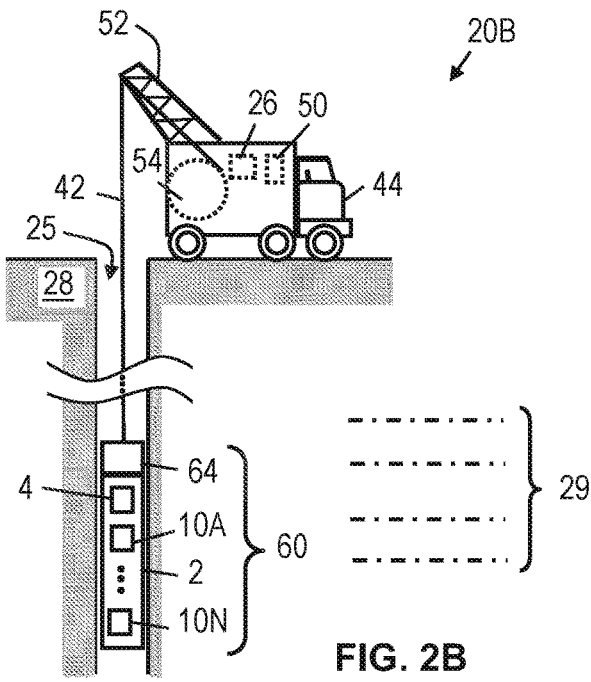
FIG. 2B is a schematic diagram showing an illustrative wireline environment.

Returning to the wireline environment of FIG. 2B, a wireline tool string 60 is suspended in a borehole 25 that penetrates formations 29 of the earth 28. For example, the wireline tool string 60 may be suspended by a conveyance 42 having conductors and/or optical fibers for conveying power to the wireline tool string 60. The conveyance 42 may also be used as a communication interface for uphole and/or downhole communications. In at least some embodiments, the conveyance 42 wraps and unwraps as needed around conveyance reel 54 when lowering or raising the wireline tool string 60. As shown, the conveyance reel 54 may be part of a movable logging facility or vehicle 42 having a conveyance guide 52.

In at least some embodiments, the wireline tool string 60 includes modular downhole logging system 2. As previously described with respect to FIG. 1, the modular downhole logging system 2 includes a TX module 4 and one or more RX modules 10A-10N, where each of the RX modules 10A-10N includes a sync estimator module 14 to perform sync estimation operations as described herein. The wireline tool string 60 may also include other tools or electronics 64. The measurements collected by the modular downhole logging system 2 are conveyed to earth's surface and/or are stored by the wireline tool string 60. In either case, the measurements can be analyzed to obtain downhole formation parameters as described herein.

At earth's surface, a surface interface 26 receives the downhole formation parameters and/or related measurements via the cable 42 and conveys the downhole formation parameters and/or related measurements to a computer system 50. As previously discussed, the interface 26 and/or computer system 50 (e.g., part of the movable logging facility or vehicle 44) may perform various operations such as converting signals from one format to another and storing downhole formation parameters and/or related measurements. The computer system 50 also may perform the operations of processor 18 and/or may operate to analyze downhole formation parameters and/or related measurements to provide logs, images, or updated downhole formation models. As an example, the obtained downhole formation parameters may correspond to formation resistivity or conductivity as a function of tool or sub depth, azimuthal angle, and/or radial distance to the borehole 25.

Figure 3:
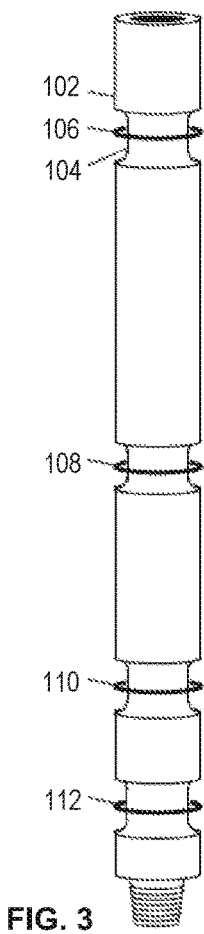
FIG. 3 is a side view showing an illustrative modular downhole logging system.

FIG. 3 is a side view showing an illustrative modular downhole logging system 2. As shown in FIG. 3, the modular downhole logging system 2 may have a housing 102 with one or more recessed regions 104. In FIG. 3, there are four recessed regions 104, each with a respective coaxial antenna 106, 108, 110, and 112. The coaxial antennas 106, 108, 110, and 112 may be insulated from the housing 102 and/or surrounded by a protective material (not shown). Example protective materials include epoxy, rubber, fiberglass, or ceramics. In such case, the recessed region 104 may be filled or partially filled with the protective material. In different embodiments, the coaxial antennas 106, 108, 110, and 112, may each have one or more loops of wire and may correspond to transmitters or receivers with separate electronics.

In one embodiment, coaxial antennas 106 and 108 are part of separate TX modules, while coaxial antennas 110 and 112 are part of separate RX modules. In operation, coaxial antenna 106 transmits an interrogation signal that propagates through a borehole space and into the surrounding formation. At coaxial antennas 110 and 112, response signals corresponding to the interrogation signal are measured to determine an amplitude attenuation and/or a phase shift between coaxial antennas 110 and 112. The measurement is repeated using coaxial antenna 108 as a transmitter. From the measured attenuation and/or phase shifts, the resistivity of the formation can be estimated.

The modular downhole logging system embodiment of FIG. 3 lacks azimuthal sensitivity, making it difficult to determine the direction of any approaching bed boundaries. Although not depicted, to provide azimuthal sensitivity, one or more of the antennas 106, 108, 110, and 112 could be tilted (different orientations for transmitter and receiver antennas provide azimuthal sensitivity). Also, different transmitter/receiver spacings and/or different frequencies for the transmitted signal enable multiple depths of investigation (i.e., radial distance to borehole sensitivity).

FIGS. 4A-4D are side views showing illustrative modular downhole logging system sub-housings (subs). The modular downhole logging system subs can be coupled to each other and/or to another housing (e.g., housing 102 of FIG. 3) to provide different antenna options for a modular downhole logging system 2. In some embodiments, modular downhole logging system subs with antennas are separated from each other by other types of subs (e.g., other logging technology subs, spacers, etc.).

The subs of FIGS. 4A-4D include a coupling mechanism that enables each sub to be coupled to other subs. In some embodiments, the coupling mechanism may be a threaded pin and box mechanism as shown in FIG. 3 and FIGS. 4A-4D. In other embodiments, the coupling mechanism may be a screw-on mechanism, a press-fit mechanism, a weld, or some other coupling means that allows subs to be assembled together with controlled azimuthal alignments.

Figure 4A:
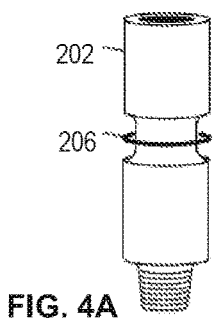
FIGS. 4A-4D are side views showing illustrative modular downhole logging system subs.
Figure 4B:
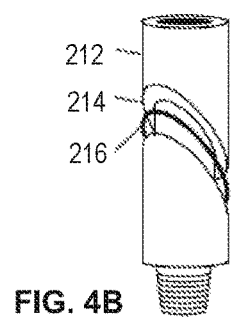
Figure 4C:
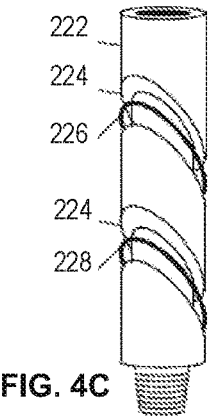
Figure 4D:
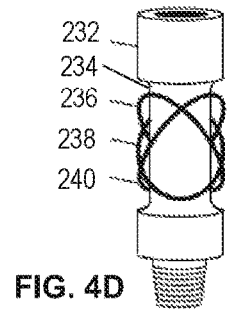

In FIG. 4A, an example modular downhole logging system sub includes a housing 202 with a single coaxial antenna 206. In FIG. 4B, another example modular downhole logging system sub includes a housing 212 with a tilted antenna 216 in a tilted recessed region 214. In FIG. 4C, another example modular downhole logging system sub includes a housing 222 with two tilted antennas 226 and 228 in respective tilted recessed regions 214. In FIG. 4D, another example modular downhole logging system sub includes a housing 232 with triaxial antenna components 236, 238, and 240 in a recessed region 234.

In FIGS. 4A-4D, the different antennas represented may be insulated from the respective housings and/or surrounded by a protective material (not shown). Example protective materials include epoxy, rubber, fiberglass, or ceramics. Also, each recessed region may be filled or partially filled with the protective material. In different embodiments, the different antennas represented may each have one or more loops of wire and may correspond to transmitters or receivers (e.g., each attachment example may correspond to one TX or RX module). In some embodiments, sub housings do not include a recessed region. In such case, any antennas are external to the sub housing and may be protected wound on a non-recessed segment of the tubular if desired, perhaps between protective wear bands.

In accordance with at least some embodiments, each sub included with a modular downhole logging system 2 may be provided with electronics that allow each antenna to operate as a transmitter or receiver. In some embodiments, a one-line power and communications bus (with the housing acting as the ground) is provided to convey power, communications, and sync control signals between subs.

Figure 5:
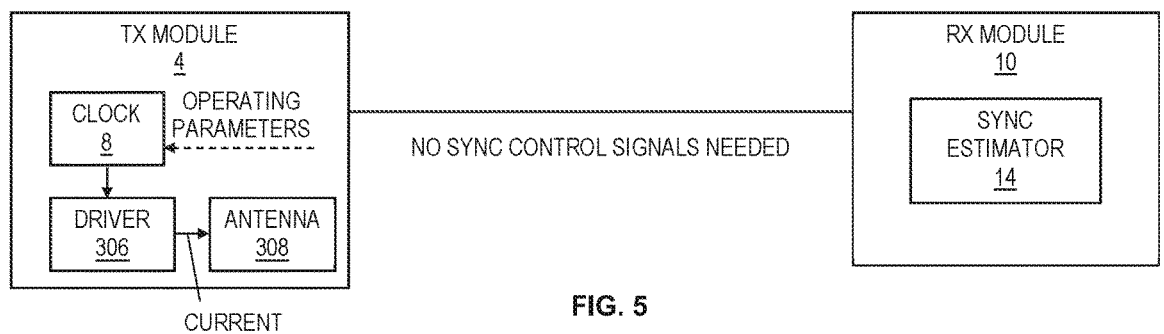
FIG. 5 is a block diagram showing components of an illustrative system with estimated synchronization.

FIG. 5 is a block diagram showing certain components of an illustrative modular downhole logging system, such as the system 2 represented in FIG. 1, with estimated synchronization as described herein. As shown, the system components include a TX module 4 that includes a local clock/ oscillator 8 that generates a drive/clock signal. The drive/clock signal and/or signals derived therefrom (e.g., using multipliers or dividers) are used to drive electronic components of the TX module 4. The TX module 4 also includes a driver 306 and an antenna 308. In operation, the driver 306 provides electrical current to the antenna 308 in accordance with the drive/clock signal from the local clock/oscillator 8 or in accordance with a local operating frequency signal derived from the drive/clock signal. The electrical current to the antenna 308 and the antenna design results in an emitted signal, at a desired operating frequency, that travels through a downhole formation (i.e., the interrogation signal is transmitted). The components represented in FIG. 5 also include an RX module 10 having a sync estimator module 14 that performs sync estimation operations as described herein. For the sync estimation operations performed by the sync estimator module 14, no sync control signals from the TX module 4 are needed. In some embodiments, measurements may be used in lieu of sync control signals. For example, the electrical current output by the driver 306 can be measured and the measurement can be conveyed to the RX module 10 and used by the sync estimator module 14 to account for a phase offset.

The TX module 4 and the RX module 10, represented in FIG. 5, may be part of a modular downhole logging system 2 (see e.g., FIG. 1, FIG. 2A, FIG. 2B) with a single housing for the TX module 4 and the RX module 10 (see e.g., FIG. 3). In another embodiment, the TX module 4 and the RX module 10 are distributed to different modular downhole logging system subs that are directly or indirectly coupled together.

Figure 6:
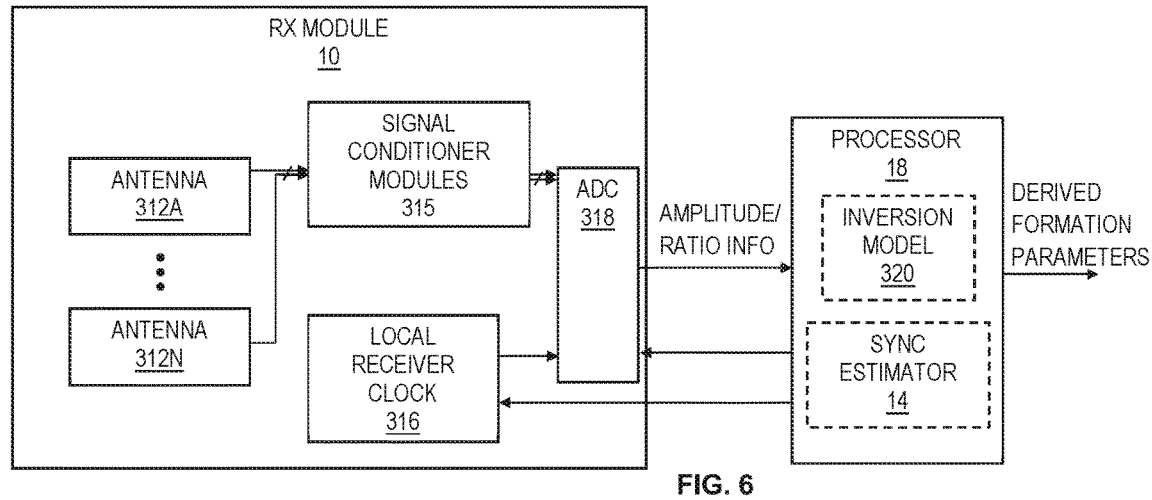
FIG. 6 is another block diagram showing components of an illustrative modular downhole logging system.

FIG. 6 is another block diagram showing components of an illustrative modular downhole logging system such as the system 2 represented in FIG. 1. In FIG. 6, some additional components of the RX module 10 are represented. For example, the RX module 10 may include one or a plurality of antennas 312A-312N that can be used for communication and/or collecting logging measurements. The antennas 312A-312N receive response signals, which are then amplified, filtered, or otherwise conditioned by respective signal conditioner modules 315 and provided to the Analog-to-Digital Converter (ADC) 318. The output of the ADC 318 corresponds to sampled response signals that provide response signal amplitude information, response signal phase information, response signal attenuation/phase ratio information, and/or other response signal information to the processor 18. In at least some embodiments, the processor 18 stores a sync estimator module 14 that causes the processor 18 to perform sync estimation operations including estimating a local frequency of a TX module (e.g., a local clock/oscillator frequency of the transmitter module or a local operating frequency for an antenna of the transmitter module) based on analysis of response signal Fourier transform results corresponding to different frequencies. Based on the results of the sync estimation operations, the processor 18 can then direct the ADC 318 and/or local receiver clock 316 of the RX module 10 to adjust sampling of the response signals based on the estimated local frequency of the TX module. For example, the processor 18 can adjust response signal sampling operations by providing control signals or information to the local receiver clock 316 and/or the ADC 318.

The processor 18, or a memory in communication with the processor 18, may also include an inversion model 320 that is used by the processor 18 to derive formation parameters from the sampled response signals or related information (e.g., amplitude, phase, and/or attenuation/phase ratio information). Also, the known amplitude and/or phase information for the interrogation signal transmitted by a TX module may be used by the inversion model 320. As an example, the derived formation parameters may correspond to formation resistivity or conductivity as a function of tool or sub depth, azimuthal angle, and/or radial distance to the borehole. The formation parameters can be conveyed to earth's surface and displayed to a user (e.g., a log or image) as described herein. The user may use the displayed information to select directional drilling options, surface operations, and/or downhole operations (e.g., well planning operations, well completion operations, etc). Additionally or alternatively, the derived formation parameters can be provided to downhole tools configured to perform operations (e.g., valve control, perforator control, screen control, etc.) based on the derived formation parameters.

The RX module 10 and the processor 18, represented in FIG. 6, may be part of a modular downhole logging system 2 (see e.g., FIG. 1, FIG. 2A, FIG. 2B) with a single housing for the RX module 10 and the processor 18. In another embodiment, the RX module 10 and the processor 18 are distributed to different modular downhole logging system subs that are directly or indirectly coupled together. In different embodiments, the processor 18 may correspond to downhole components only, surface components only, or a combination of downhole and surface components.

A brief description of synchronization, related issues, and proposed estimation solutions follows. With the sync estimation techniques disclosed herein, signal synchronization between modular downhole logging system modules (part of one or more housings) can be resolved without using clock system information and without calibration to synchronize clock systems among the separate modules. Without synchronization among antennas, the local operating frequency at a receiver module is not same as the local operating frequency at a transmitter module, resulting in inaccurate amplitude and phase measurements during the Fourier Transform process. Ideally, the local frequencies of the transmitter and receiver are equal and fixed to facilitate the Fourier Transform process and acquire the corresponding complex amplitude values (or phase and magnitude). However, local frequencies of separated transmitter and receiver modules often vary slightly and drift due to temperature change, etc., Accordingly, the local frequency at the receiver will be offset from the local frequency at the transmitter when Fourier Transform operations are performed on the receiver measurements. For example, the local clock/oscillator of an RX module may have randomly drifted relative to the local clock/oscillator of a TX module during high temperature operations. If there is no bus communication to synchronize the local clocks/oscillators among different modular downhole logging system modules, the operating frequency for transmitter and receiver antennas often drift and the amplitude/phase of Fourier Transform results will be wrong.

With the disclosed sync estimation techniques, using the limited downhole bus bandwidth for synchronization operations is avoided. Instead of intra-module synchronization schemes involving conveying sync clock or sync control signals via a bus, the disclosed embodiments employ processing schemes to adjust the received response signals to compensate for the effect of non-synchronization and/or to otherwise account for non-synchronized portions of the received response signals. With the proposed processing schemes, sampled response signal information used to derive downhole formation parameters will account for any synchronization offset without clock information being passed from a TX module to a RX module.

Equation 1 gives a general description of a complex voltage measurement of a receiver antenna with respect to a transmitter antenna firing.

$$V_{Rx} = Amp_{Target} \times e^{j(pha_{Tx}+pha_{Rx}+pha_{Target})} \quad (1)$$

The magnitude ($Amp_{Target}$) of the complex measurement is typically affected by any media in between the transmitter antenna and the receiver antenna but not affected by any electronics at the transmitter and/or receiver antennas. This is due to the Fourier Transform scheme applied to the measurement to determine the magnitude of a target signal (typically as formation signal) only. The phase part of the complex voltage measurement is dominated by three parts; that is, the phase delay ($pha_{Tx}$) in the electronics of the transmitter antenna, the phase delay ($pha_{Rx}$) in the electronics of the receiver antenna, and the phase delay of the target signal. In order to acquire accurate complex voltage signal only from the target, the phase delay in both transmitter antenna and receiver antenna has be captured and/or synchronized.

In some embodiments (e.g., LWD electromagnetic resistivity tools), ratio signals of the complex measurements are used to characterize formation properties surrounding the logging tools or subs. An example ratio signal can be taken between measurements of two receivers with respect to a transmitter firing. Equations 2a and 2b give the description of the two receiver measurements.

$$V_{Rx1} = Amp_1 \times e^{j(pha_{Tx}+pha_{Rx1}+pha_1)} \quad (2a)$$

$$V_{Rx2} = Amp_2 \times e^{j(pha_{Tx}+pha_{Rx2}+pha_2)} \quad (2b)$$

Since the two receiver measurements are from the same transmitter antenna, the same phase delay of the transmitter antenna for both measurements is expected. In addition, the two receiver antennas may share the same electronics and receive the signals simultaneously. Therefore, the phase delay of the receiver electronics is also expected to be the same. In such case, the phase delay (or phase offset) of the two receiver antennas is calibrated out such that there is no receiver phase delay in the measurements (either $pha_{Rx1} - pha_{Rx2} = 0$ or $pha_{Rx1} = pha_{Rx2} = 0$). When taking the ratio between the two receiver measurements, Equation 3 describes how the phase delay can be eliminated in electronics such that the resulting ratio includes only information related to the surrounding target signal.

$$\frac{V_{Rx1}}{V_{Rx2}} = \quad (3)$$

$$\frac{Amp_1}{Amp_2} \times e^{j(pha_{Rx1}-pha_{Rx2})} \times e^{j(pha_1-pha_2)} = \frac{Amp_1}{Amp_2} \times e^{j(pha_1-pha_2)}$$

As an example, assume the designed operating frequency is 2 kHz and the oscillator frequency is 16.384 MHz. Also, assume the clock accuracy range is ±250 ppm over the operational temperature range and the worst-case clock drift is −250 ppm at the transmitter and +250 ppm at the receiver. Table 1 shows transmitter and receiver values in a non-synchronized scenario. As shown in Table 1, the true operating frequency ($f_{0_{Tx}}$) from the transmission signal is drifted by the transmitter clock, making the true Tx operating frequency 1.9995 kHz. In addition, the sampling frequency ($f_{s_{Rx}}$) of the receiver is also drifted due to the receiver clock. Accordingly, the discrete data measured at the receiver will be at an operating frequency value offset from the true operating frequency from the transmitter. Without synchronization, the receiver sampling frequency ($f_s$) of 16.004 kHz is used in the receiver measurements. Consequently, Equation 4 can be used to determine the final operating frequency ($f_{0_{Rx}}$) measured by the receiver, given by:

$$f_{0_{Rx}} = f_{0_{Tx}} \times \frac{f_s}{f_{s_{Rx}}} \quad (4)$$

The worst case will produce the frequency variation of 1 Hz at the receiver measurement as shown in Table 1.

| Antenna | Oscillator Frequency | Sampling Frequency (fs) | Operating Frequency | Operating Frequency Variation |
|---|---|---|---|---|
| Transmitter | 16.384 MHz − 250 ppm = 16.379904 MHz | $\frac{16.379904 \text{ MHz}}{2^{10}} =$ 15.996 kHz | 15.996 kHz/8 = 1.9995 kHz | 0.5 Hz |
| Receiver | 16.384 MHz + 250 ppm = 16.388096 MHz | $\frac{16.388096 \text{ MHz}}{2^{10}} =$ 16.004 kHz | $1.9995 \times \frac{16}{16.004} =$ 1.9990 kHz | 1 Hz |

In accordance with at least some embodiments, operating frequency drifts are accounted for by performing sync estimation operations as described herein. For example, in the worst-case scenario above (−250 ppm at Tx clock and +250 ppm at Rx clock), non-synchronized clocks will produce different sampling frequencies at the transmitter ($fs_{Tx}$) and at the receiver ($fs_{Rx}$), whereas the transmitter sampling frequency will be used to produce a signal with operating frequency ($f_{0_{Tx}}$). Using equations 5a and 5b, two signals are generated (Signal 1 and Signal 2) using the transmitter sampling frequency. Specifically, Signal 1 has amplitude of 1.0 and Signal 2 has amplitude of 0.5.

$$\text{Signal } 1(n) = 1.0 \times \cos\left(2\pi f_{0_{Tx}} \times \frac{1}{f_{s_{Rx}}} \times (n)\right) \quad (5a)$$

$$\text{Signal } 2(n) = 0.5 \times \cos\left(2\pi f_{0_{Tx}} \times \frac{1}{f_{s_{Rx}}} \times (n)\right) \quad (5b)$$

Figure 7:
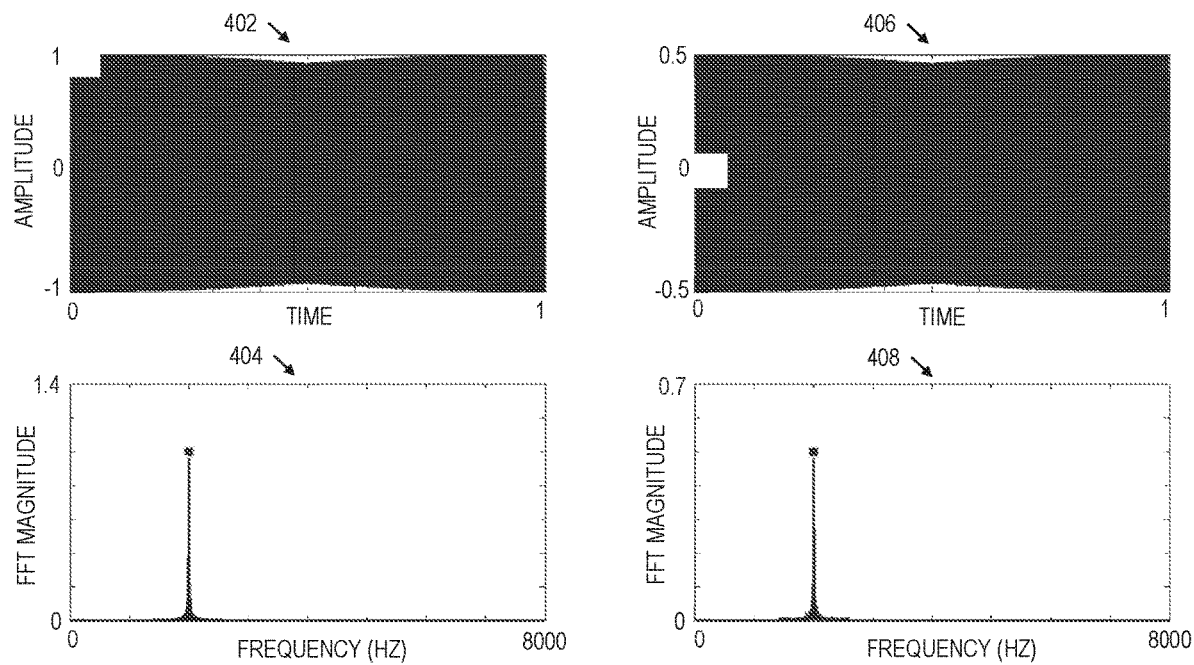
FIGS. 7-12 are graphs showing representative signals, Fourier transform parameters, and normalized values.
Figure 8:
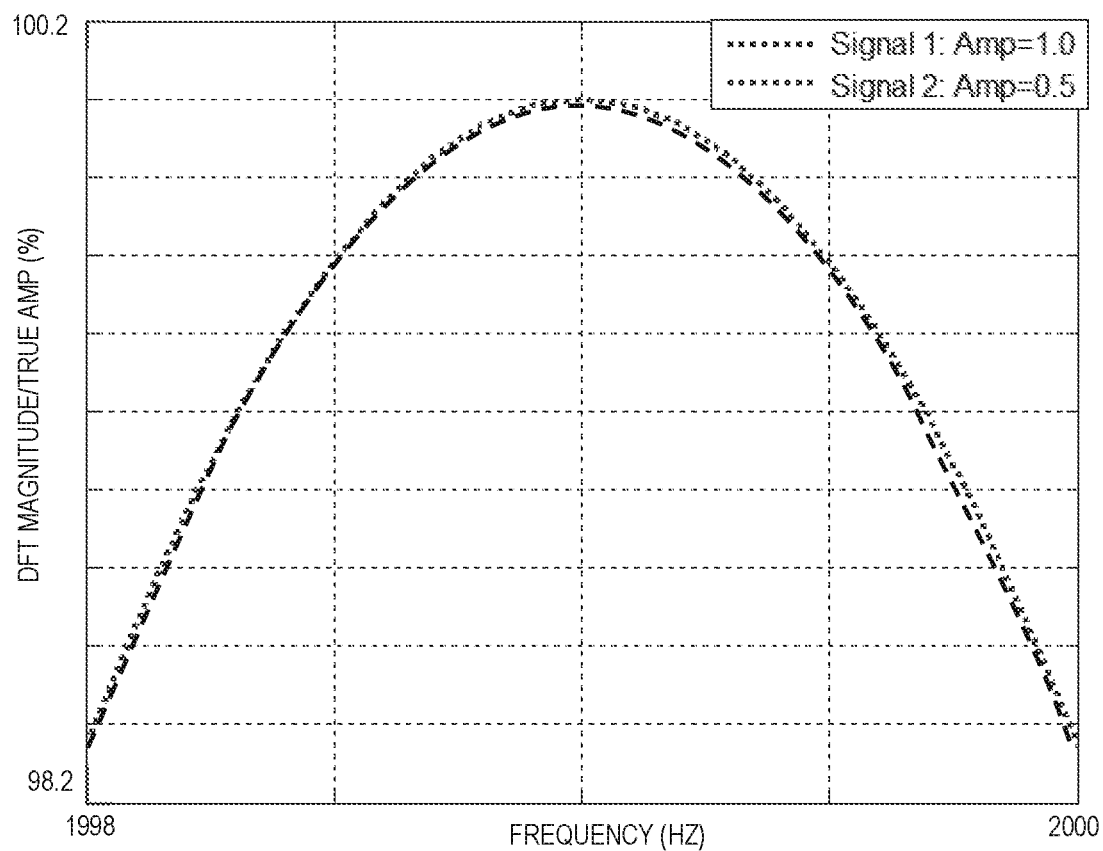
Figure 9:
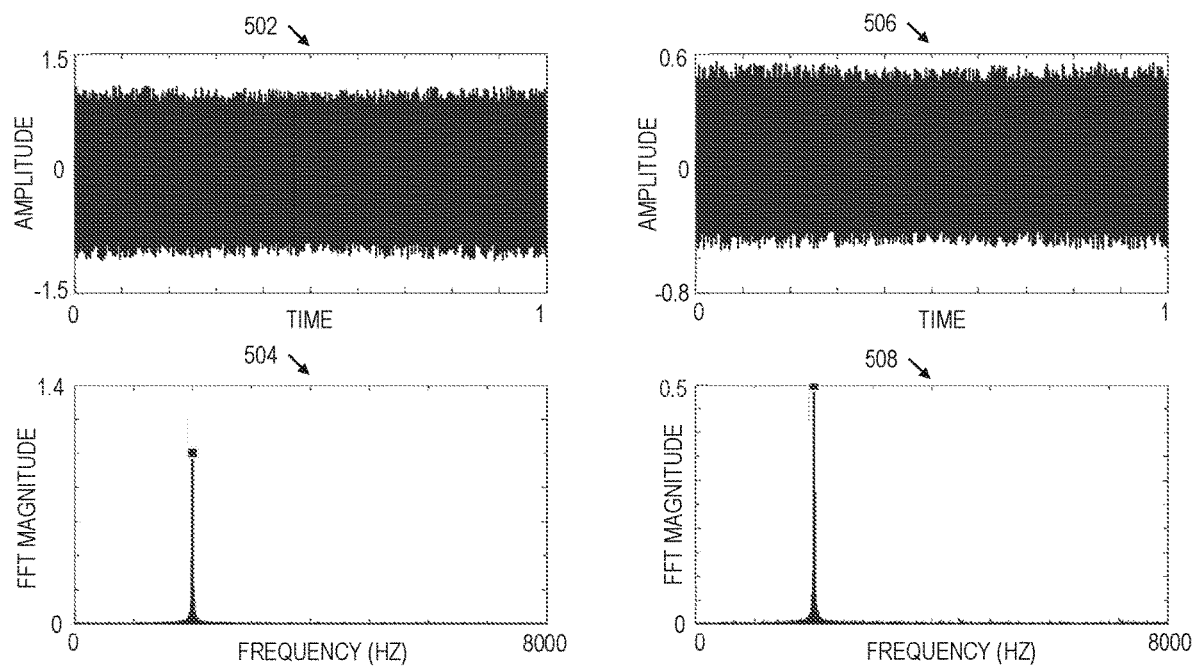
Figure 10:
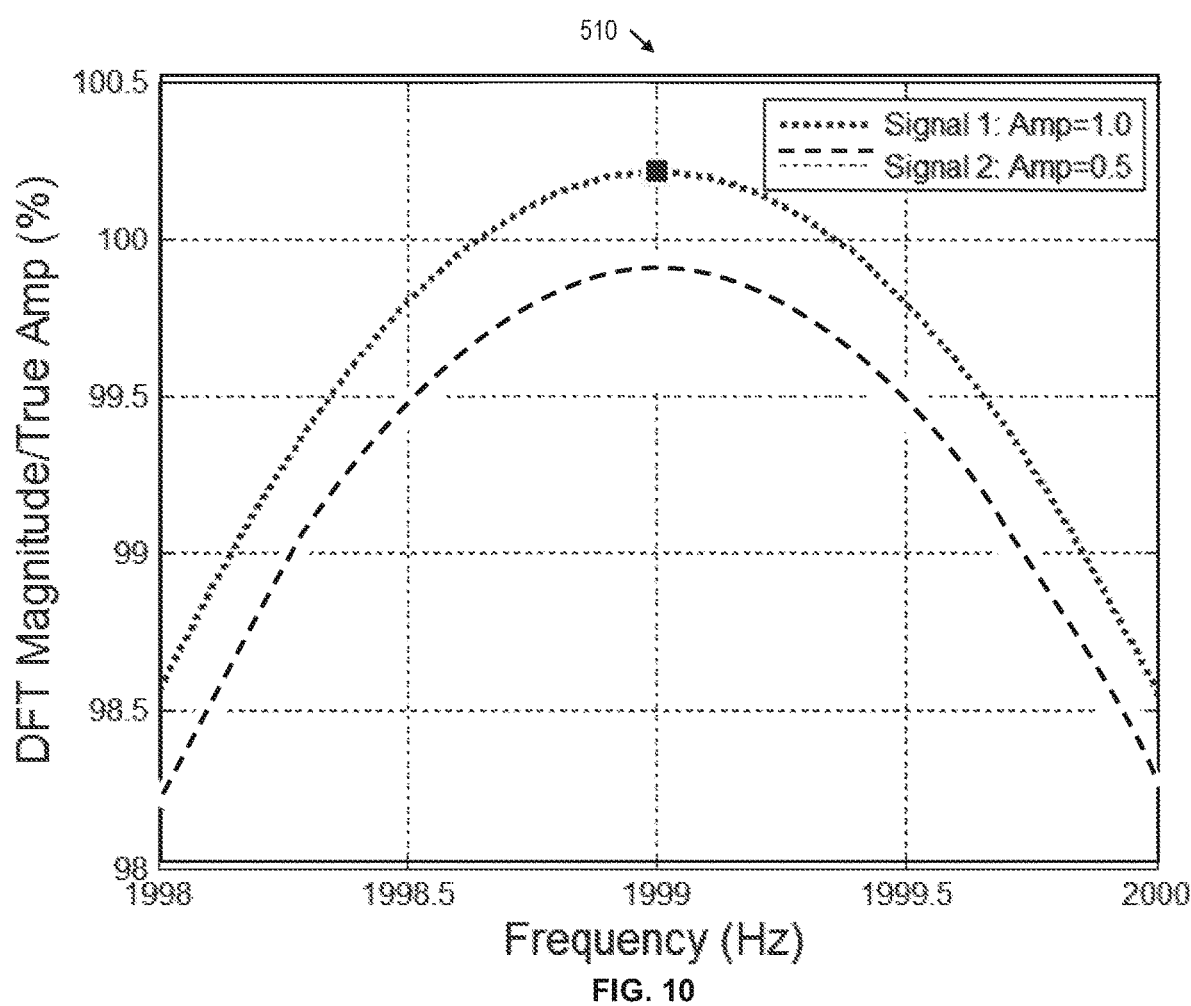
Figure 11:
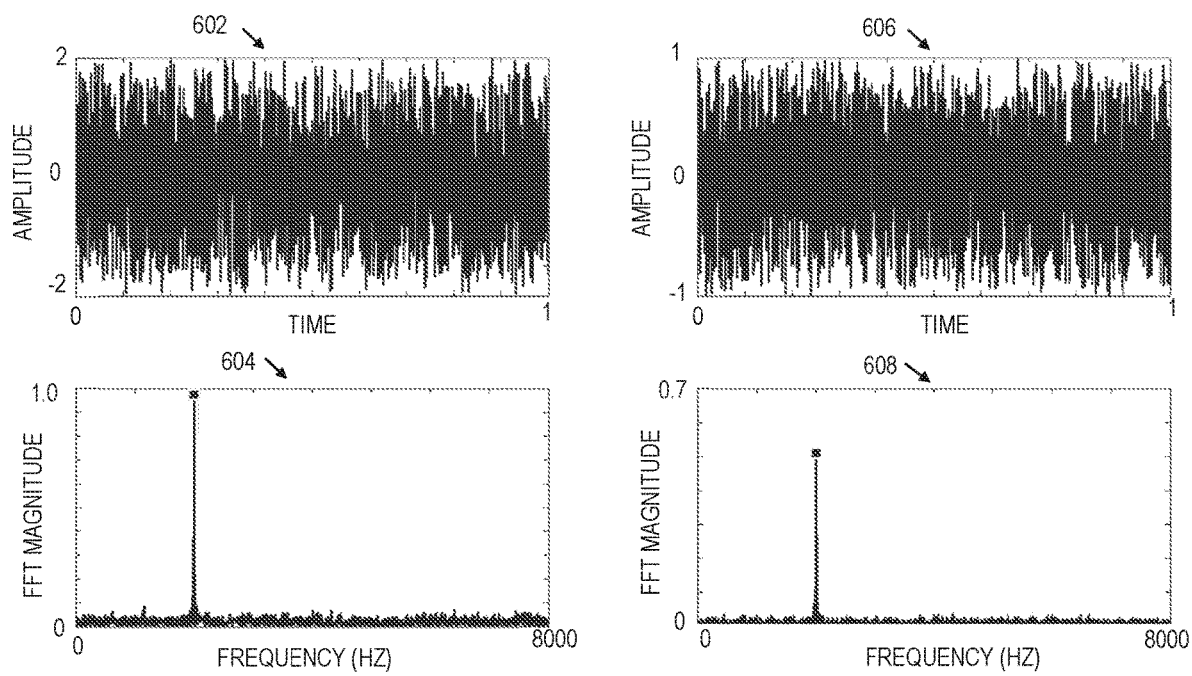
Figure 12:
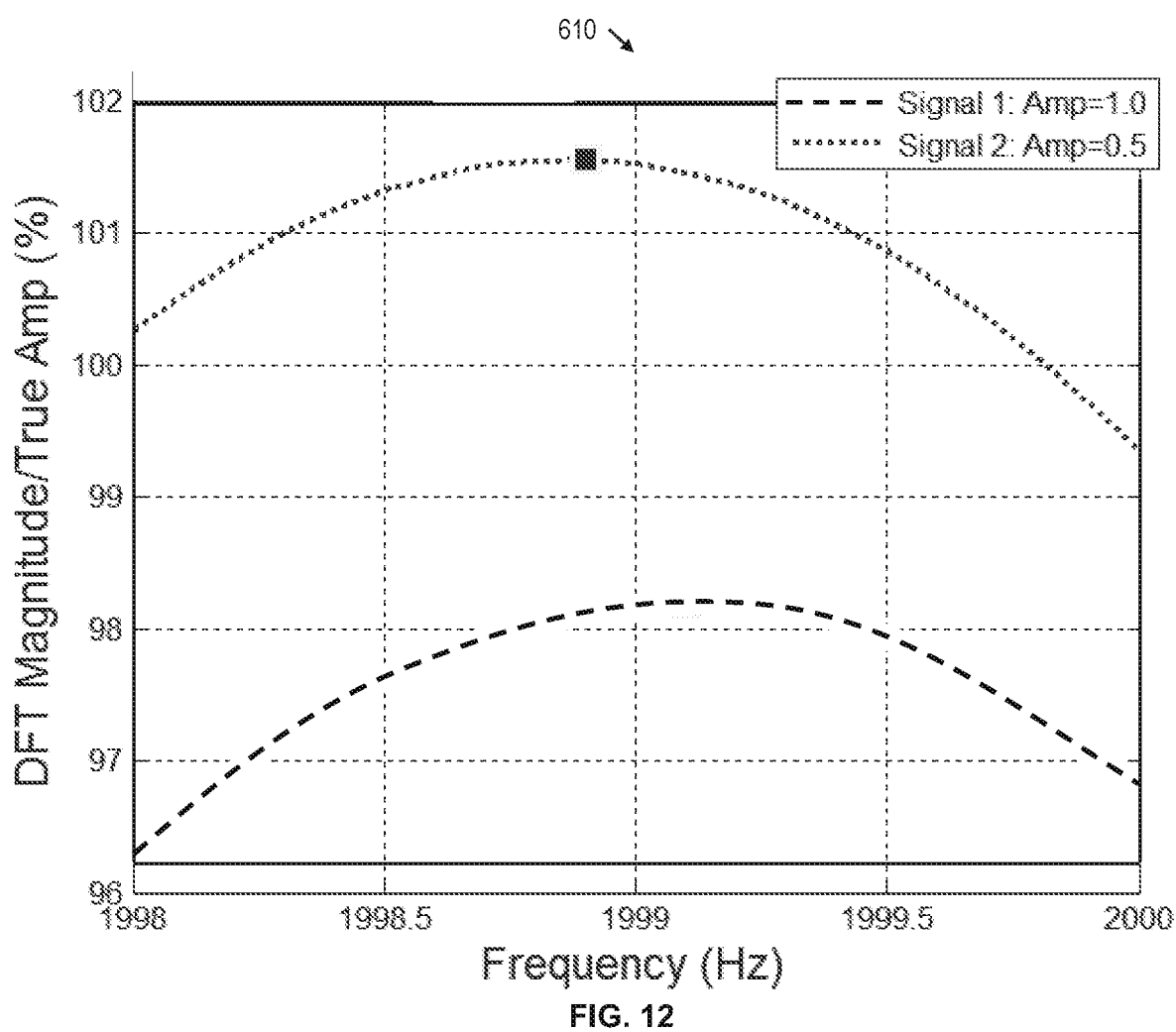

Without any clock information herein, the designed sampling frequency ($f_s$) is used in the Fourier Transform. As shown in FIG. 7, by taking one-second measurements at receiver with respect to operating frequency of 2 kHz as well as the parameters in Table 1, both Signal 1 and Signal 2 have the peak amplitude at 1999 Hz after fast Fourier Transform (FFT). Consequently, if a discrete Fourier Transform (DFT) is performed near the operating frequency of 2 kHz as shown in FIG. 8 (DFT frequency range from 1.998 kHz to 2.0 kHz), the received operating frequency drift can be determined by looking at the peak value of DFT amplitudes near the operating frequency of 2 kHz. To evaluate the proposed methods, random noise is injected to the Equations 5a and 5b to achieve SNR of 10. The corresponding time-domain signal and FFT amplitudes are shown in FIG. 9. Meanwhile, FIG. 10 shows results of using the proposed method, where the peak amplitude is represented and can be used to determine the true operating frequency. Even if SNR is 1.0 as shown in FIG. 11, the proposed method is still able to determine true operating frequency as in FIG. 12.

Once the received operating frequency is determined by the methods above, the determined frequency value can be also updated to a forward modeling in advanced processing, such as distance-to-bed-boundary (DTBB) inversion. This can also improve accuracy of later processing operations by providing better operating frequency values.

Even though the received operating frequency can be estimated as described herein, there is another issue regarding phase measurements. Without sharing clock information among modules, if two receivers are located at different modules and are not synchronized, Equation (3) is not valid anymore and an additional phase term will be received in the ratio signal, affecting later processing accuracy (such as resistivity determination, DTBB inversion, etc.). Also, in some modular downhole logging system embodiments only the complex voltage signal is used instead of the ratio signal (amplitude ratio and/or phase ratio). Consequently, for Equation 1 or Equation 2 to be used in the processing calculation, a determination of the phase delays in all electronics related to the transmitter/receiver antennas is needed. Determining or synchronizing phase delay among antennas is different, especially in high temperature environments where phase delay often drifts.

Accordingly, in accordance with at least some embodiments, techniques are applied to remove or account for phase delay drift among antennas. More specifically, azimuthal measurements of a receiver antenna with respect to a transmitter firing can be given as:

$$V_{Rx}(\beta) = e^{j(pha_{Tx} + pha_{Rx})} \times (A \cos(2\beta) + B \cos(\beta) + C) \quad (6)$$

In Equation 6, $\beta$ is the azimuth angle relative to formations and A, B, and C correspond to predetermined multi-component measurements. To decouple the multi-coupling components, the azimuth measurements of the two collocated receivers (physically collocated or pseudo collocated after certain processing schemes) are used to calculate various signals having similar sensitivity to multi-coupling components. Equations (7a) and (7b) present the general description of the azimuthal measurements at the two receivers.

$$V_{Rx1}(\beta) = e^{j(pha_{Tx} + pha_{Rx1})} \times (A1 \cos(2\beta + 2\beta1) + B1 \cos(\beta + \beta1) + C1) \quad (7a)$$

$$V_{Rx2}(\beta) = e^{j(pha_{Tx} + pha_{Rx2})} \times (A2 \cos(2\beta + 2\beta2) + B2 \cos(\beta + \beta2) + C2) \quad (7b)$$

In Equations 7a and 7b, $\beta1$ and $\beta2$ indicates the azimuthal angle of each receiver antenna related to the formations, and A1, B1, and C1 are the complex amplitude signals for a first receiver. Meanwhile, A2, B2, and C2 are the complex amplitude signals for a second receiver. With the presence of the phase delays due to electronics of the antennas, proposed summation and subtraction will have additional phase delay term in the equations, given by $$\text{Signal } 1 = (A1 e^{j(pha_{Rx1})} + A2 e^{j(pha_{Rx2})}) e^{j(pha_{Tx})} \quad (8a)$$

$$\text{Signal } 2 = (A1 e^{j(pha_{Rx1})} - A2 e^{j(pha_{Rx2})}) e^{j(pha_{Tx})} \quad (8b)$$

$$\text{Signal } 3 = (B1 e^{j(pha_{Rx1})} + B2 e^{j(pha_{Rx2})}) e^{j(pha_{Tx})} \quad (8c)$$

$$\text{Signal } 4 = (B1 e^{j(pha_{Rx1})} - B2 e^{j(pha_{Rx2})}) e^{j(pha_{Tx})} \quad (8d)$$

$$\text{Signal } 5 = (C1 e^{j(pha_{Rx1})} + C2 e^{j(pha_{Rx2})}) e^{j(pha_{Tx})} \quad (8e)$$

$$\text{Signal } 6 = (C1 e^{j(pha_{Rx1})} - C2 e^{j(pha_{Rx2})}) e^{j(pha_{Tx})} \quad (8e)$$

Equation 8a-8f show processing schemes between two receivers to decouple various coupling components and related ratio signals. Such ratio signals will immediately remove the phase delay due to the transmitter antenna. With collocated receivers (e.g., in the same module and thus synchronized), the phase delay from receiver antennas can be removed from Equations 8a-8f and Signals 1-6 can be used for further processing without taking synchronization into consideration.

The method mentioned above to account for phase delay drift can be applied to any measurements (not just azimuthal measurements) as long as the two measurements correspond to the follow scenarios: (1) the measurements are received at two receivers with synchronized phase with respect to a same transmitter antenna; (2) the measurements are received at one receiver with respect to two transmitter antennas with phase synchronized; or (3) the measurements are received at one receiver with respect to one transmitter but firing at different time, depths or azimuthal angles. Equation 9 gives a general example of the processing concept for the 3 described scenarios.

$$\text{Synchronized Signal} = \frac{Amp1_{Rx1} \times e^{j(pha_{Tx1} + pha_{Rx1} + pha_1)} + Amp2_{Rx2} \times e^{j(pha_{Tx2} + pha_{Rx2} + pha_2)}}{Amp3_{Rx3} \times e^{j(pha_{Tx3} + pha_{Rx3} + pha_3)} + Amp4_{Rx4} \times e^{j(pha_{Tx4} + pha_{Rx4} + pha_4)}} = \\ \frac{Amp1_{Rx1} \times e^{j(pha_1)} + Amp2_{Rx2} \times e^{j(pha_2)}}{Amp3_{Rx3} \times e^{j(pha_3)} + Amp4_{Rx4} \times e^{j(pha_4)}} \quad (9)$$

It is noted that the values for Amp1-Amp4 can be zero, meaning not using one of the measurements. As shown in Equation 9, the proposed method herein does not try to capture the phase delay but rather removes the phase delay term in the desired signals for further processing, such as anisotropy inversion, DTBB inversion, etc.

It is also possible to determine and then remove the phase delay of the transmitter in Equation 9. For example, a device can be installed at the transmitter antenna to measure the current signal during the transmitter antenna firing. Such current signal will carry phase delay identical to the phase delay of the transmission signal. Therefore, individual receiver measurements with respect to a transmitter firing can be normalized by the current measurement of that transmitter as follow:

$$V_{Rx} = \frac{Amp_{Target}}{I_{Tx} e^{j(pha_{Tx})}} \times e^{j(pha_{Tx} + pha_{Rx} + pha_{Target})} = \\ \frac{Amp_{Target}}{I_{Tx}} \times e^{j(pha_{Rx} + pha_{Target})} \quad (10)$$

Consequently, Equation (9) can be modified as follows:

$$\text{Synchronized Signal} = \frac{\frac{Amp1_{Rx1}}{I_{Tx1}} \times e^{j(pha_{Rx1}+pha_1)} + \frac{Amp2_{Rx2}}{I_{Tx2}} \times e^{j(pha_{Rx2}+pha_2)}}{\frac{Amp3_{Rx3}}{I_{Tx3}} \times e^{j(pha_{Rx3}+pha_3)} + \frac{Amp4_{Rx4}}{I_{Tx4}} \times e^{j(pha_{Rx4}+pha_4)}} = \quad (11)$$

$$\frac{\frac{Amp1_{Rx1}}{I_{Tx1}} \times e^{j(pha_1)} + \frac{Amp2_{Rx2}}{I_{Tx2}} \times e^{j(pha_2)}}{\frac{Amp3_{Rx3}}{I_{Tx3}} \times e^{j(pha_3)} + \frac{Amp4_{Rx4}}{I_{Tx4}} \times e^{j(pha_4)}}$$

Equation 11 provides a better compensation scheme by considering the actual amplitude of transmitter's firing, while Equation 9 assumes the amplitude of each transmitter is fixed and consistent.

Figure 13:
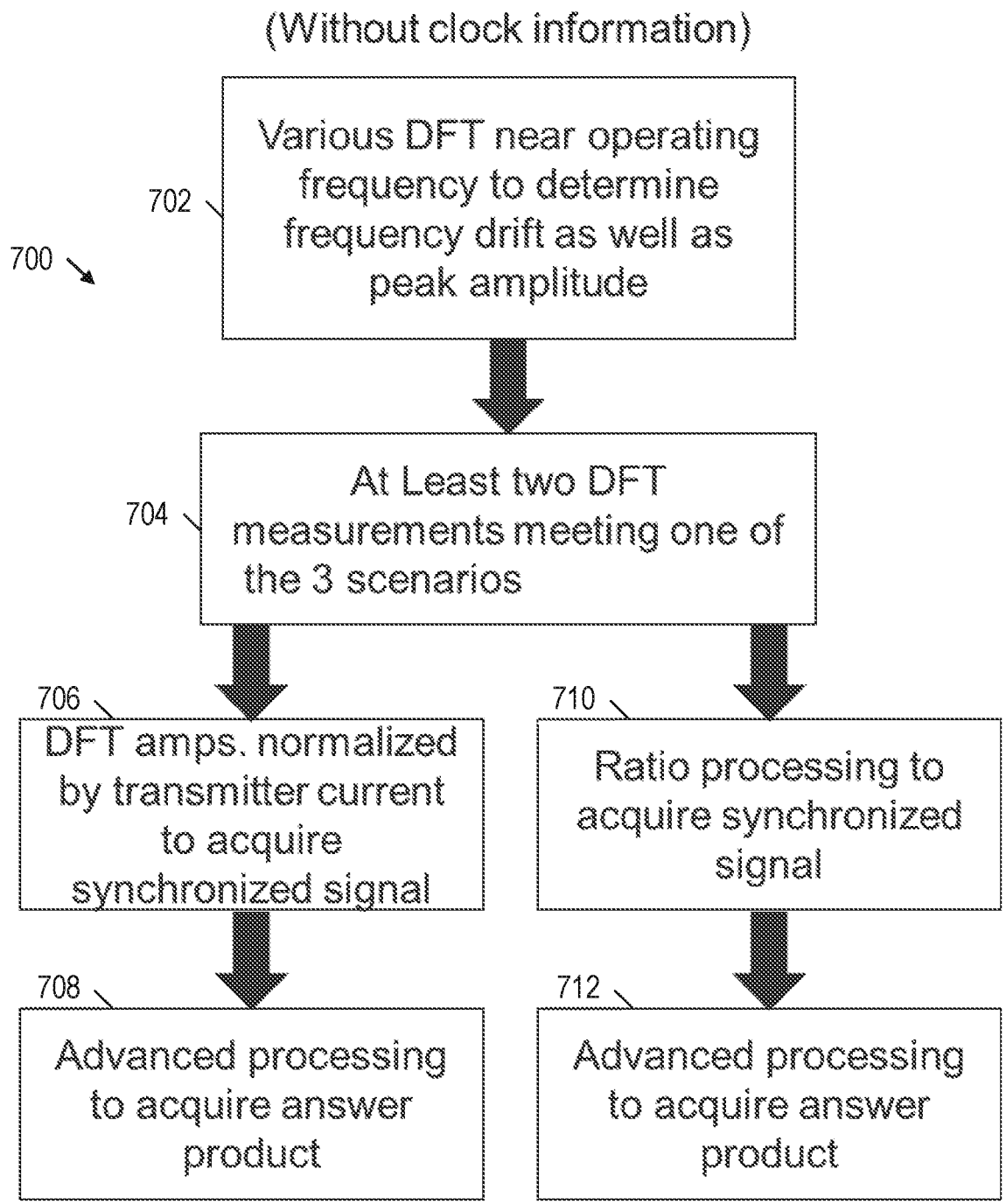
FIG. 13 is a flowchart showing an illustrative logging method.

FIG. 13 is a flowchart showing an illustrative logging method 700 related to a modular downhole logging system as described herein. As shown, the method 700 includes performing various Discrete Fourier Transforms (DFTs) near an expected operating frequency to determine frequency drift and peak amplitude (block 702). At block 704, at least two DFT measurements that meet one of three scenarios are obtained. The three scenarios are: (1) the measurements are received at two receivers with synchronized phase with respect to a same transmitter antenna; (2) the measurements are received at one receiver with respect to two transmitter antennas with phase synchronized; or (3) the measurements are received at one receiver with respect to one transmitter but firing at different time, depths or azimuthal angles. At block 706, DFT amplitudes are normalized based on transmitter current measurements to acquire a synchronized signal. At block 708, advanced processing is performed to acquire answer product (e.g., inversion is performed to derive formation properties). As another option, ratio processing may be performed to acquire a synchronized signal at block 710. At block 712, advanced processing is performed to acquire answer product (e.g., inversion is performed to derive formation properties).

Figure 14:
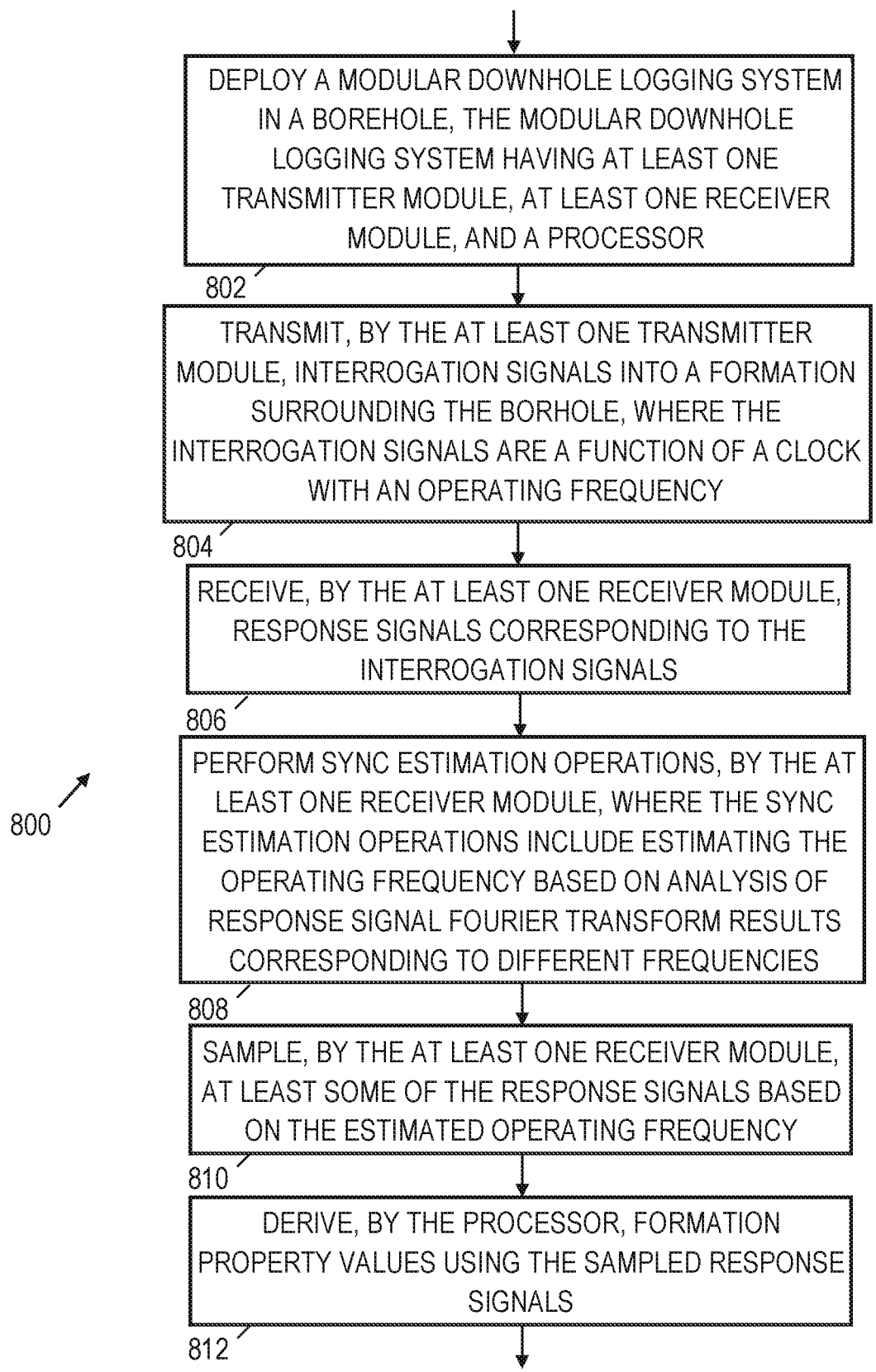
FIG. 14 is a flowchart showing an illustrative method with estimated synchronization between modules of a modular downhole logging system.

FIG. 14 is a flowchart showing an illustrative method 800 with estimated synchronization between modules of a modular downhole logging system. At block 802, a modular logging logging system is deployed in a borehole, where the modular downhole logging system has at least one transmitter module, at least one receiver module, and a processor. The deployment options may involve, for example, a drillstring, a wireline, a slick line, a coiled tubing, a tractor assembly, a tubing string, or other deployment options. For some deployment options (e.g., wireline or wired pipe/tubing options), power is available from earth's surface to the downhole location. For other deployment options (e.g., certain slick line, coiled tubing, drill string, tractor assembly, and tubular string options), power is not available from earth's surface to the downhole location. Accordingly, operations of a modular downhole logging system 2 may be power from earth's surface and/or may be powered by a remote power source (e.g., batteries).

At block 804, interrogation signals are transmitted into a formation surrounding the borehole, where the interrogation signals are a function of a clock with an operating frequency. At block 806, response signals corresponding to the interrogation signals are received by the at least one receiver module. While blocks 804 and 806 are described sequentially, it should be appreciated different interrogation signals can be transmitted at different times and thus the response signals for each interrogation signals can be received at different times (before or after the next interrogation signal is transmitted). At block 808, sync estimation operations are performed by the at least one receiver module, where the sync estimation operations include estimating the local frequency of the at least one transmitter module based on response signal Fourier transform results corresponding to different frequencies. At block 810, at least some of the response signals are sampled by the at least one receiver module based on the estimated local frequency of the at least one transmitter module. At block 812, formation property values are derived by the processor using the sampled response signals. The method 800 can be repeated as desired such that formation property values are determined for different modular downhole logging system (or corresponding subs) positions, azimuths, radial distance from the borehole, etc.

Embodiments disclosed herein include:

A: A modular downhole logging system that comprises a transmitter module having a local frequency, wherein the transmitter module transmits interrogation signals into a formation based on the local frequency. The modular downhole logging system also comprises a receiver module axially-spaced from the transmitter module and that receives response signals corresponding to the interrogation signals, wherein the receiver module includes sampling logic and sync estimation logic. The sync estimation logic is configured to perform sync estimation operations including estimating the local frequency of the transmitter module based on analysis of response signal Fourier transform results corresponding to different frequencies. The sampling logic is configured to sample the response signals based on the estimated local frequency of the transmitter module.

B: A method that comprises deploying a modular downhole logging system in a borehole, the modular downhole logging system having at least one transmitter module, at least one receiver module, and a processor. The method also comprises transmitting, by the at least one transmitter module, interrogation signals into a formation surrounding the borehole, wherein the interrogation signals are a function of a local frequency of the at least one transmitter module. The method also comprises receiving, by the at least one receiver module axially-spaced from the at least one transmitter module, response signals corresponding to the interrogation signals. The method also comprises performing sync estimation operations, by the at least one receiver module, wherein the sync estimation operations include estimating the local frequency of the at least one transmitter module based on analysis of response signal Fourier transform results corresponding to different frequencies. The method also comprises sampling, by the at least one receiver module, at least some of the response signals based on the estimated local frequency of the at least one transmitter module. The method also comprises deriving, by the processor, formation property values using the sampled response signals.

Each of the embodiments, A and B, may have one or more of the following additional elements in any combination. Element 1: wherein the sync estimation operations include determining response signal ratios to account for phase offset, wherein the processor derives formation property values using the response signal ratios. Element 2: wherein the sync estimation operations include normalizing response signals based on a predetermined transmitter current to account for phase offset, wherein the processor derives formation property values using the normalized response signals. Element 3: further comprising at least one additional receiver module, wherein the sync estimation operations are performed when response signals are received by two receiver modules with synchronized phase with respect to the transmitter module. Element 4: further comprising at least one additional transmitter module, wherein the sync estimation operations are performed when response signals corresponding to two transmitter modules with synchronized phase are received by the receiver module. Element 5: wherein the sync estimation operations are performed when response signals corresponding to interrogation signals initiated by the transmitter module at different times, depths, or azimuthal angles are received by the receiver module. Element 6: wherein the transmitter module and the receiver module are components of a drillstring that performs logging-while-drilling (LWD) operations while deployed in a borehole. Element 7: wherein the transmitter module and the receiver module are components of a tool string deployed in an open borehole via wireline, slick line, coiled tubing, or tubular string. Element 8: wherein the transmitter module and the receiver module are components of a tool string deployed within a casing string installed in a borehole, wherein the tool string is deployed via wireline, slick line, coiled tubing, or tubular string. Element 9: wherein the transmitter module is part of a first downhole sub and the receiver module is part of a second downhole sub. Element 10: wherein the first downhole sub and second downhole sub are coupled through one or more intervening downhole subs.

Element 11: wherein the sync estimation operations include determining response signal ratios that account for phase offset, wherein said deriving is based at least in part on the response signal ratios. Element 12: wherein the sync estimation operations include normalizing the response signals based on a predetermined transmitter current logic to account for phase offset, wherein said deriving is based at least in part on the normalized response signals. Element 13: wherein the sync estimation operations are performed when response signals are received by two receiver modules with synchronized phase with respect to a given transmitter module. Element 14: wherein the sync estimation operations are performed when response signals corresponding to two transmitter modules with synchronized phase are received by a receiver module. Element 15: wherein the sync estimation operations are performed when response signals corresponding to interrogation signals initiated by a given transmitter module at different times, depths, or azimuthal angles are received by a given receiver module. Element 16: wherein deploying the modular downhole logging system comprises lowering a drillstring with the modular downhole logging system into the borehole. Element 17: wherein deploying the modular downhole logging system comprises using a wireline, slick line, coiled tubing, or tubing string to lower a tool string with the modular downhole logging system into the borehole. Element 18: wherein the at least one transmitter module and the at least one receiver module are distributed across a plurality of downhole subs of the modular downhole logging system.

Numerous other variations and modifications will become apparent to those skilled in the art once the above disclosure is fully appreciated. It is intended that the following claims be interpreted to embrace all such variations and modifications where applicable.

What is claimed is:

1. A modular downhole logging system that comprises:
a transmitter module having a local frequency, wherein the transmitter module transmits interrogation signals into a formation based on the local frequency; and
a receiver module axially-spaced from the transmitter module and that receives response signals corresponding to the interrogation signals, wherein the receiver module includes sampling logic and sync estimation logic, wherein the sync estimation logic is configured to perform sync estimation operations including estimating the local frequency of the transmitter module based on analysis of response signal Fourier transform results corresponding to different frequencies, and wherein the sampling logic is configured to sample the response signals based on the estimated local frequency of the transmitter module,
wherein a processor derives formation property values using the sampled response signals.

2. The modular downhole logging system of claim 1, wherein the sync estimation operations include determining response signal ratios to account for phase offset, wherein the processor derives formation property values using the response signal ratios.

3. The modular downhole logging system of claim 1, wherein the sync estimation operations include normalizing response signals based on a predetermined transmitter current to account for phase offset, wherein the processor derives formation property values using the normalized response signals.

4. The modular downhole logging system of claim 1, further comprising at least one additional receiver module, wherein the sync estimation operations are performed when response signals are received by two receiver modules with synchronized phase with respect to the transmitter module.

5. The modular downhole logging system of claim 1, further comprising at least one additional transmitter module, wherein the sync estimation operations are performed when response signals corresponding to two transmitter modules with synchronized phase are received by the receiver module.

6. The modular downhole logging system of claim 1, wherein the sync estimation operations are performed when response signals corresponding to interrogation signals initiated by the transmitter module at different times, depths, or azimuthal angles are received by the receiver module.

7. The modular downhole logging system of claim 1, wherein the transmitter module and the receiver module are components of a drillstring that performs logging-while-drilling (LWD) operations while deployed in a borehole.

8. The downhole system of claim 1, wherein the transmitter module and the receiver module are components of a tool string deployed in an open borehole via wireline, slickline, coiled tubing, or tubular string.

9. The modular downhole logging system of claim 1, wherein the transmitter module and the receiver module are components of a tool string deployed within a casing string installed in a borehole, wherein the tool string is deployed via wireline, slickline, coiled tubing, or tubular string.

10. The modular downhole logging system according to claim 1, wherein the transmitter module is part of a first downhole sub and the receiver module is part of a second downhole sub.

11. The modular downhole logging system of claim 10, wherein the first downhole sub and second downhole sub are coupled through one or more intervening downhole subs.

12. A method that comprises:
- deploying a modular downhole logging system in a borehole, the modular downhole logging system having at least one transmitter module, at least one receiver module, and a processor;
- transmitting, by the at least one transmitter module, interrogation signals into a formation surrounding the borehole, wherein the interrogation signals are a function of a local frequency of the at least one transmitter module;
- receiving, by the at least one receiver module axially-spaced from the at least one transmitter module, response signals corresponding to the interrogation signals;
- performing sync estimation operations, by the at least one receiver module, wherein the sync estimation operations include estimating the local frequency of the at least one transmitter module based on analysis of response signal Fourier transform results corresponding to different frequencies;
- sampling, by the at least one receiver module, at least some of the response signals based on the estimated local frequency of the at least one transmitter module; and
- deriving, by the processor, formation property values using the sampled response signals.

13. The method of claim 12, wherein the sync estimation operations include determining response signal ratios that account for phase offset, wherein said deriving is based at least in part on the response signal ratios.

14. The method of claim 12, wherein the sync estimation operations include normalizing the response signals based on a predetermined transmitter current logic to account for phase offset, wherein said deriving is based at least in part on the normalized response signals.

15. The method of claim 12, wherein the sync estimation operations are performed when response signals are received by two receiver modules with synchronized phase with respect to a given transmitter module.

16. The method of claim 12, wherein the sync estimation operations are performed when response signals corresponding to two transmitter modules with synchronized phase are received by a receiver module.

17. The method of claim 12, wherein the sync estimation operations are performed when response signals corresponding to interrogation signals initiated by a given transmitter module at different times, depths, or azimuthal angles are received by a given receiver module.

18. The method of claim 12, wherein deploying the modular downhole logging system comprises lowering a drillstring with the modular downhole logging system into the borehole.

19. The method of claim 12, wherein deploying the modular downhole logging system comprises using a wireline, slick line, coiled tubing, or tubing string to lower a tool string with the modular downhole logging system into the borehole.

20. The method according to claim 12, wherein the at least one transmitter module and the at least one receiver module are distributed across a plurality of downhole subs of the modular downhole logging system.

* * * * *